(12) United States Patent
Caseau (10) Patent No.: US 11,324,056 B2
(45) Date of Patent: May 3, 2022

(54) ESTABLISHMENT OF A COMMUNICATION BY ALLOCATING TO A CALLER TERMINAL AN INTERMEDIATE CALL IDENTIFIER DEDICATED TO THE COMMUNICATION

(71) Applicant: ORANGE, Issy-les-Moulineaux (FR)

(72) Inventor: Francois Caseau, Paris (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/315,400

(22) PCT Filed: Jun. 15, 2017

(86) PCT No.: PCT/FR2017/051550
§ 371 (c)(1),
(2) Date: Jan. 4, 2019

(87) PCT Pub. No.: WO2018/007705
PCT Pub. Date: Jan. 11, 2018

(65) Prior Publication Data
US 2019/0215880 A1    Jul. 11, 2019

(30) Foreign Application Priority Data
Jul. 7, 2016    (FR) ..................... 1656547

(51) Int. Cl.
*H04W 76/11*    (2018.01)
*H04W 8/26*    (2009.01)
*H04M 3/436*    (2006.01)

(52) U.S. Cl.
CPC ......... *H04W 76/11* (2018.02); *H04M 3/4365* (2013.01); *H04W 8/26* (2013.01)

(58) Field of Classification Search
None
See application file for complete search history.

(56) References Cited

U.S. PATENT DOCUMENTS 5,818,836 A * 10/1998 DuVal .............. H04M 3/42008
370/389
8,103,215 B2 * 1/2012 Rek .................... H04L 65/1069
455/41.2

(Continued)

FOREIGN PATENT DOCUMENTS

FR     2821222 A1    8/2002
KR  20020069535 A *  9/2002
(Continued)

OTHER PUBLICATIONS

Written Opinion of the International Searching Authority dated Oct. 16, 2017 for corresponding International Application No. PCT/FR2017/051550, filed Jun. 15, 2017.

(Continued)

*Primary Examiner* — Sai Aung
*Assistant Examiner* — Liem H. Nguyen
(74) *Attorney, Agent, or Firm* — David D. Brush; Westman Champlin & Koehler, P.A.

(57) ABSTRACT

A method of establishing, by a communication management platform, a communication from a first communication device intended for a second communication device. When the platform sends a message to the first device that contains a call identifier dedicated to the communication to be established, the platform intercepts a call from the first device to the dedicated call identifier, then routes the call to the main call identifier of the second device, by using a secondary call identifier of the first device that the platform has previously assigned thereto. When the platform sends a message to the first device indicating the absence of a dedicated call identifier, the first device triggers a call to the main identifier of the second device, by using the main call identifier of the first device.

20 Claims, 5 Drawing Sheets

(56) References Cited

U.S. PATENT DOCUMENTS

| | | | |
|---|---|---|---|
| 9,350,858 B1* | 5/2016 | Roths | H04M 3/42068 |
| 2004/0114747 A1* | 6/2004 | Trandal | H04M 3/436 |
| | | | 379/211.02 |
| 2004/0145651 A1 | 7/2004 | Nachef et al. | |
| 2004/0190522 A1* | 9/2004 | Aerrabotu | H04L 29/12009 |
| | | | 370/395.3 |
| 2005/0036457 A1* | 2/2005 | Salin | H04L 51/14 |
| | | | 370/328 |
| 2007/0130465 A1 | 6/2007 | Zeng et al. | |
| 2008/0084982 A1* | 4/2008 | Chatterjee | H04L 51/04 |
| | | | 379/201.01 |
| 2009/0080629 A1* | 3/2009 | Rokosky | H04M 15/8044 |
| | | | 379/188 |
| 2010/0064172 A1* | 3/2010 | George | H04L 67/147 |
| | | | 714/15 |
| 2010/0124218 A1* | 5/2010 | Bredikhin | G06F 16/951 |
| | | | 370/352 |
| 2015/0271336 A1* | 9/2015 | Backhaus | H04L 65/1069 |
| | | | 379/211.02 |
| 2016/0088162 A1* | 3/2016 | Carlos | H04M 3/42187 |
| | | | 370/259 |

FOREIGN PATENT DOCUMENTS

| | | | | |
|---|---|---|---|---|
| WO | WO-2012064990 A1 * | 5/2012 | | H04W 8/12 |
| WO | 2016203159 A1 | 12/2016 | | |

OTHER PUBLICATIONS

International Search Report dated Oct. 10, 2017 for corresponding International Application No. PCT/FR2017/051550, filed Jun. 15, 2017.

Written Opinion of the International Searching Authority dated Oct. 10, 2017 for corresponding International Application No. PCT/FR2017/051550, filed Jun. 15, 2017.

* cited by examiner

ESTABLISHMENT OF A COMMUNICATION BY ALLOCATING TO A CALLER TERMINAL AN INTERMEDIATE CALL IDENTIFIER DEDICATED TO THE COMMUNICATION

CROSS-REFERENCE TO RELATED APPLICATIONS

This Application is a Section 371 National Stage Application of International Application No. PCT/FR2017/051550, filed Jun. 15, 2017, which is incorporated by reference in its entirety and published as WO 2018/007705 A1 on Jan. 11, 2018, not in English.

FIELD OF THE INVENTION

The present invention relates to the establishment of a communication from a first communication device destined for a second communication device, the first and second communication devices each having a main call identifier. It relates more particularly to communication services which guarantee the anonymity of a calling user.

BACKGROUND OF THE INVENTION

Communication services which guarantee the anonymity of a calling user currently propose to allocate a secondary call identifier to the terminal of the calling user already having a main call identifier. For example, in the case where the calling user has a terminal of mobile communication, the main call identifier is an MSISDN (in English "Mobile Station International Subscriber Directory Number") identifier corresponding in a unique manner to the SIM (in English "Subscriber Identity Module") card which is provided by the operator of the mobile network with which the user has registered. As a general rule, this identifier is the telephone number of the mobile terminal in said mobile network. Such services which guarantee anonymity are for example proposed when the calling subscriber wishes to place an advertisement on an Internet site dedicated to this effect, such as for example a classified ads site, a dating site, a social network of personal or professional type, etc. It is then proposed that the user benefit from a secondary call identifier which allows the latter to use this secondary call identifier to contact by telephone any person who has left their contact details on the dedicated Internet site, without having to divulge their main call identifier to this person. The calling user is also reachable on this secondary call identifier.

Such an anonymity guaranteeing service operates in the following manner. The user who wishes to benefit therefrom registers previously with the platform managing this service by providing their personal contact details, and in particular their main call identifier. A secondary call identifier is then allocated to them and is thereafter recorded in the platform in correspondence with their main identifier. The user downloads the application dedicated to this service onto their telephone. When the user wishes to reach a user of an Internet site such as mentioned above and whose management platform communicates with the platform of the anonymity guaranteeing service, it dispatches to said platform, via the application, a message containing their main call identifier and the main call identifier of the user that they wish to call. On the basis of the main identifier of the calling terminal, the service platform retrieves the secondary call identifier of the calling terminal and dispatches in return to the calling terminal a message containing a call identifier dedicated to the communication to be established, which is for example a specific telephone number previously recorded in the platform of the anonymity guaranteeing service. The reception of this message by the calling terminal then triggers a voice call destined for the dedicated call identifier. This call is intercepted by a router of the communication network which has prior knowledge of the dedicated call identifier. For this purpose, the router retrieves the secondary identifier of the calling terminal from the platform of the anonymity guaranteeing service, and then sends a call from this secondary identifier to the main call identifier of the terminal of the called user. Finally, the router establishes the communication between the calling terminal and the called terminal.

Although the service described hereinabove is well adapted to effectively guarantee the anonymity of the user who has subscribed thereto and ensure the continuity of the call, it may turn out to be very expensive for the caller when, for example, the call identifier dedicated to the communication to be established is situated in a different tariff zone from that in which the main identifier of the called terminal is situated. Thus, for example, if the main identifier of the called terminal is associated with a communication network of fixed type and the call identifier dedicated to the communication to be established is associated by the service platform with a communication network of mobile type, the call placed from this identifier to the main call identifier of the called terminal turns out ultimately to be very expensive for the user of the calling terminal. Such an imbalance of charges is therefore prejudicial to the use of this type of communication service guaranteeing the anonymity of the calling user.

Furthermore, such an anonymity guaranteeing service is limited to a single usage context conditioned by the subscription of the user to targeted Internet sites.

OBJECT AND SUMMARY OF THE INVENTION

One of the aims of the invention is to remedy drawbacks of the aforementioned prior art.

For this purpose, a subject of the present invention relates to a method for establishing a communication from a first communication device destined for a second communication device, the first and second communication devices each having a main call identifier, the method implementing, at the level of a communication management device:

a reception, originating from the first communication device, of a message comprising:
  identification information items associated with the first communication device which have been previously recorded in the communication management device,
  the main call identifier of the second communication device, a search for an association between the main call identifier of the second communication device and a predetermined call identifier which is dependent either on the main call identifier of the second communication device contained in the message received, or on a communication service associated with the communication to be established, if an association is found:
  selection of the predetermined call identifier as call identifier dedicated to the communication to be established, dispatching to the first communication device of a
message containing the dedicated call identifier,
interception of a call of the first communication device
to the dedicated call identifier, and then routing of the
call to the main call identifier of the second communication device, by using a secondary call identifier of the first communication device, the secondary identifier having been previously associated in
correspondence with the identification information
items associated with the first communication
device,
if no association is found, dispatching to the first communication device of a message indicating the absence
of association, thereby triggering a call of the first
communication device to the main call identifier of the
second communication device, by using the main call
identifier of the first communication device.

Having regard to the fact that, according to a first alternative of the invention, the call identifier dedicated to the communication to be established is determined as a function of the main call identifier of the second communication device, it is thus ensured that the tariff zone in which the call identifier dedicated to the communication to be established is situated is the same as that in which the main call identifier of the second communication device, that is to say the communication device for which the call is destined, is situated. Consequently, this first alternative of the invention advantageously makes it possible to guarantee the anonymity of the calling user while ensuring call termination balancing and avoiding disturbing the chain of call costs for the calling user.

Moreover, having regard to the fact that, according to a second alternative of the invention, the call identifier dedicated to the communication to be established is determined as a function of a communication service associated with the communication to be established, the establishment of the communication under cover of anonymity can be widened to communication contexts other than that of a call to a user of an Internet site. Such a communication service is for example a company communication service in which an employee wishes to establish a communication of professional type from their personal communication device.

When it is not possible to find an association between a predetermined call identifier and the main identifier of the second communication device, a message is advantageously dispatched to the first communication device to notify it of the absence of association. The reception of this message then triggers a call from the first communication device destined for the main call identifier of the second communication device. For this call, it is the main call identifier of the first communication device which is used.

Such an arrangement thus makes it possible not to occasion any break in communication, even when an association is not found between a predetermined call identifier and the main identifier of the second communication device.

Such a method for establishing communication is adapted to both voice and text communications. This method is moreover particularly well adapted for voice communications where the user, originating the communication, must be put through to the called party directly and in real time.

According to a particular embodiment, an association between the main call identifier of the second communication device and a predetermined call identifier which is dependent on the main call identifier of the second communication device implements the following:
identification of the type of network to which the second
communication device is connected,
selection of a predetermined call identifier in accordance
with the type of network identified, as call identifier
dedicated to the communication to be established.

Such an arrangement makes it possible to assign, in a simple manner, to the same call tariff zone, the call identifier dedicated to the communication to be established and the main call identifier of the second communication device.

According to another embodiment, an association between the main call identifier of the second communication device and a predetermined call identifier which is dependent on a communication service associated with the communication to be established implements a selection of a predetermined call identifier corresponding to a free-of-charge call identifier, as call identifier dedicated to the communication to be established.

Such an arrangement allows the calling user to place free-of-charge calls from the first communication device, on condition that he has been registered with a communication service associated with the communication to be established, such a communication service having been recorded beforehand in the communication management device. Such an arrangement is particularly adapted to a company communication service, in which the employee is liable to place professional calls on the move, from their personal telephone.

The various aforementioned embodiments or characteristics of realization can be added independently or in combination with one another to the above-defined method for establishing communication.

The invention also relates to a calling communication device, having a main call identifier, and able to request a communication with a communication device to be called, having a main call identifier, the calling communication device comprising a processing circuit which is designed to:
dispatch, destined for a communication management
device, a message which comprises:
identification information items associated with the
calling communication device which have been previously recorded in the communication management
device,
the main call identifier of the communication device to
be called,
receive, originating from the communication management device, either a call identifier dedicated to the
communication to be established which is dependent
either on the main call identifier of the communication
device to be called, or on a communication service
associated with the communication to be established, or
else a message indicating the absence of call identifier
dedicated to the communication to be established,
in case of reception of a dedicated call identifier, trigger
a call to the dedicated call identifier, by using a secondary call identifier of the calling communication
device, such a secondary identifier having been previously associated in correspondence with the identification information items associated with the calling communication device,
in case of reception of a message indicating the absence
of dedicated call identifier, trigger a call to the main call
identifier of the second communication device, by
using the main call identifier of the calling communication device.

The invention also relates to a communication management platform for the establishment of a communication from a first communication device destined for a second communication device, the first and second communication devices each having a main call identifier, the communication management platform comprising a processing circuit which is designed to:

receive, originating from the first communication device, a message comprising:
  identification information items associated with the first communication device which have been previously recorded in the communication management platform,
  the main call identifier of the second communication device,
 search for an association between the main call identifier of the second communication device and a predetermined call identifier which is dependent either on the main call identifier of the second communication device contained in the message received, or on a communication service associated with the communication to be established,
 if an association is found:
  select the predetermined call identifier as call identifier dedicated to the communication to be established,
  dispatch to the first communication device a message containing the dedicated call identifier,
  intercept a call of the first communication device to the dedicated call identifier, and then route this call to the main call identifier of the second communication device, by using a secondary call identifier of the first communication device, such a secondary identifier having been previously associated in correspondence with the identification information items associated with the first communication device,
 if no association is found, dispatch to the first communication device a message indicating the absence of association, thereby triggering a call of the first communication device to the main call identifier of the second communication device, by using the main call identifier of the first communication device.

The invention further relates to a computer program for implementing program code instructions for the execution of the steps of the method for establishing a communication according to the invention, when such a program is executed on a communication management platform.

This program may use any programming language, and be in the form of source code, object code, or of code intermediate between source code and object code, such as in a partially compiled form, or in any other desirable form.

The invention also envisages a recording medium readable by a computer on which is recorded a computer program, this program comprising instructions adapted for the implementation of the method such as described hereinabove for establishing communication according to the invention.

The recording medium may be any entity or device capable of storing the program. For example, the medium may comprise a storage means, such as a ROM, for example a CD ROM or a microelectronic circuit ROM, a USB key or else a magnetic recording means, for example a hard disk.

Moreover, the recording medium may be a transmissible medium such as an electrical or optical signal, which can be conveyed via an electrical or optical cable, by radio or by other means. The program according to the invention may be in particular downloaded over a network of Internet type.

Alternatively, the recording medium may be an integrated circuit in which the program is incorporated, the circuit being adapted to execute or to be used in the execution of the aforementioned method for establishing communication.

BRIEF DESCRIPTION OF THE DRAWINGS

Other characteristics and advantages will become apparent on reading a preferred embodiment described with reference to the figures in which.

DETAILED DESCRIPTION OF AN EMBODIMENT

Figure 1:
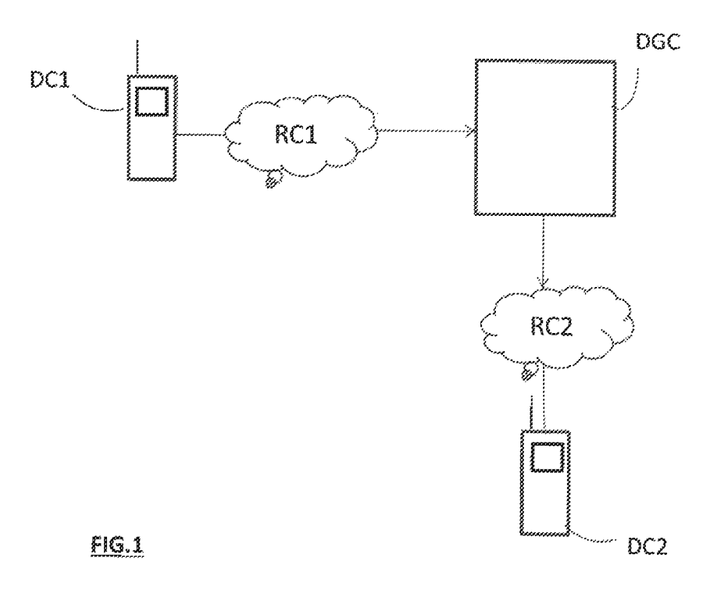
FIG. 1 is a schematic and general view of a system for establishing a communication according to the invention.

FIG. 1 shows schematically the system in which is implemented the method for establishing a communication according to a preferred embodiment. For the sake of clarity in FIG. 1, certain well-known elements of this system are not represented. Such elements are for example servers, nodes, base stations, gateways or yet other entities of the telecommunications network which is used in this system.

The system comprises a first communication device DC1 able to establish a communication destined for a second communication device DC2.

In the example represented, the communication device DC1 is a mobile telephone comprising a SIM card endowed with a unique subscriber identifier called IMSI (English abbreviation standing for "International Mobile Subscriber Identity"). In a manner known per se, this identifier is used to identify the communication device DC1 in its attachment communication network RC1, that is to say the network to which the user UT1 of the communication device DC1 has subscribed. In the example represented, the network RC1 is of mobile type such as a GSM (English abbreviation standing for "Global System for Mobile communications") or UMTS (English abbreviation standing for "Universal Mobile Telecommunications System") network. The identifier IMSI is associated with a main MSISDN call identifier, denoted IAP1, which is the telephone number making it possible to reach the communication device DC1.

This example is of course not limiting. Thus, according to another example, the communication device DC1 is for example a fixed telephone attached to a private telephone exchange PABX (from the English "Private Automatic Branch eXchange").

Depending on the type of the communication network RC1, the main call identifier IAP1 of the communication device DC1 could be different from a telephone number. For example, it could consist of metadata associated with the user UT1 of the communication device DC1, such as in particular an image or information about the user, such as their name and their address.

The second communication device DC2 is able to receive the communication initiated by the communication device DC1. In the same manner as the communication device DC1, the communication device DC2 is also endowed with a main call identifier IAP2. In the example represented, the communication device DC2 is a mobile telephone attached to a communication network RC2 of mobile type. However, the communication device DC2 can also be a fixed telephone attached to a switched telecommunications network or else a communication server, such as for example a server for receiving emergency calls.

According to another example, not represented, the communication networks RC1 and RC2 can form a unique communication network of one and the same telecommunications operator.

Furthermore, in the present description, by "communication" is meant a conventional voice call or any other communication session of data and/or audio and/or video type initiated by the communication device DC1 destined for the communication device DC2.

The system represented in FIG. 1 furthermore comprises a communication management device DGC. Such a device is a platform installed in the network which is intended to:
  process any communication initiated by the communication device DC1 on the basis of its main call identifier IAP1,
  and conversely process any communication initiated by the communication device DC2 on the basis of its main call identifier IAP2, destined for the main identifier IAP1 of the communication device DC1.

Figure 2:
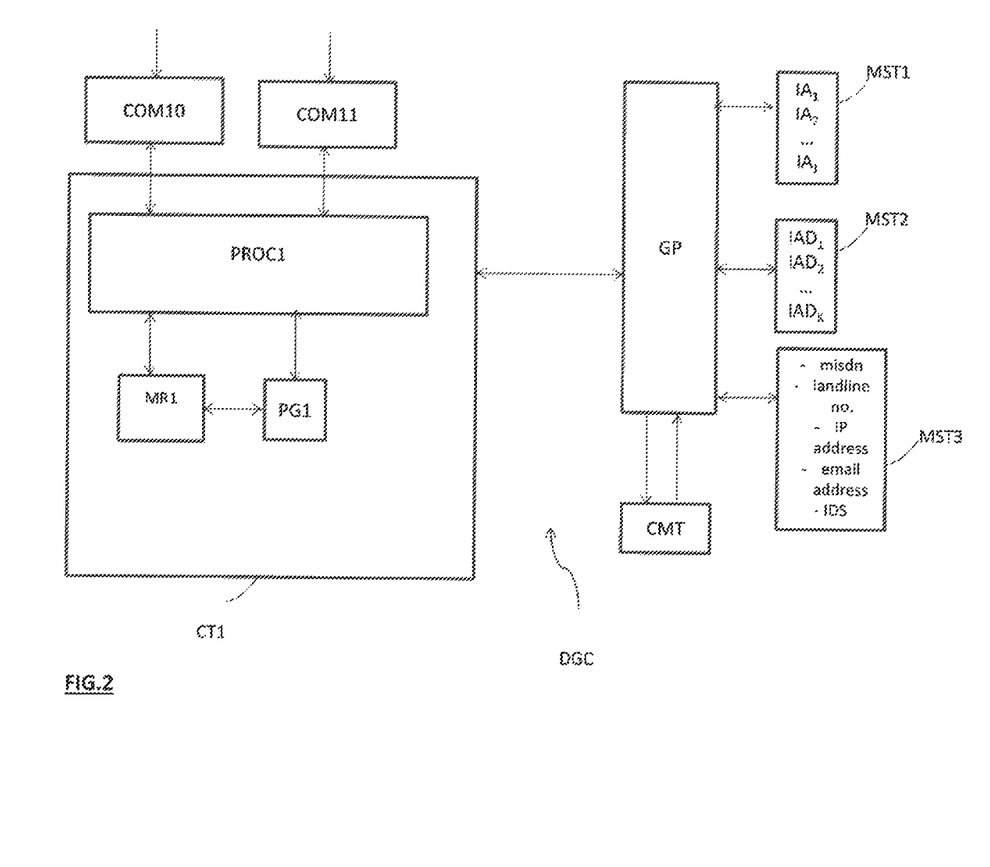
FIG. 2 presents the simplified structure of an embodiment of a communication management device belonging to the system of FIG. 1.

In conjunction with FIG. 2, the simplified structure of the communication management platform DGC according to an exemplary embodiment of the invention is now considered. Such a platform is adapted to implement the method which will be described hereinbelow for establishing a communication according to the invention.

For example, the communication management platform DGC comprises physical and/or software resources, in particular a processing circuit CT1 for implementing the method for establishing communication according to the invention, the processing circuit CT1 containing a processor PROC1 driven by a computer program PG1.

On initialization, the code instructions of the computer program PG1 are for example loaded into a RAM memory, denoted MR1, before being executed by the processing circuit CT1.

The communication management platform DGC comprises mainly:
  a communication interface COM10 which is adapted to exchange messages with the communication device DC1 of FIG. 1, via the network RC1 or else another network not represented in FIG. 1, said messages being in accordance for example with the http protocol (English abbreviation standing for "HyperText Transfer Protocol"),
  a communication interface COM11 able to communicate with the communication devices DC1 and DC2 and which, depending on the type of communication to be established, maybe a communication interface able to send or receive voice calls or a communication interface able to send or receive text messages of SMS (from the English "Short Message Service") type or else a communication interface able to send or receive multimedia messages of MMS (from the English "Multimedia Messaging Service") type,
  a profiles manager GP able to manage the profile of the user UT1 of the communication device DC1,
  a first storage module MST1, for example a database, linked to the profiles manager GP and containing a plurality of secondary call identifiers $IA_1$, $IA_2$, ..., $IA_m$, ..., $IA_J$ where J is an integer greater than or equal to 1 and $1 \leq m \leq J$,
  a second storage module MST2, for example a database, linked to the profiles manager GP and containing a plurality of predetermined call identifiers $IAD_1$, $IAD_2$, ..., $IAD_n$, ..., $IAD_K$, where K is an integer greater than or equal to 1 and $1 \leq n \leq K$,
  a third storage module MST3, for example a database, linked to the profiles manager GP and containing identification information items associated with the communication device DC1, these information items having been, during a prior exchange established between the user UT1 of the communication device DC1 and the platform DGC, communicated to the latter, and then recorded in the third storage module MST3 in association with one of the secondary call identifiers stored in the first storage module MST1, for example the secondary call identifier $IA_m$.

Such identification information items are for example the identifier msisdn of the communication device DC1, the landline number of the user UT1 of the communication device DC1, the IP address or else the permanent email address of the user UT1.

The communication interfaces COM10, COM11, and also the profiles manager GP, are driven by the processor PROC1 of the processing circuit CT1.

According to one embodiment, the aforementioned secondary call identifiers $IA_1$, $IA_2$, ..., $IA_m$, ..., $IA_J$ form part of a pool allotted by the administrator of the platform DGC to a partner service provider with which the user UT1 of the communication device DC1 has previously registered. Stated otherwise, this pool of secondary call identifiers is reserved for the service to which the user UT1 has subscribed. If the user UT1 subscribes to another partner service of the communication management platform DGC, a different pool of secondary call identifiers will be reserved for this other service.

A secondary call identifier selected from the pool of secondary call identifiers $IA_1$, $IA_2$, ..., $IA_m$, ..., $IA_J$, for example the identifier $IA_m$, is associated with the identification information items relating to the communication device DC1, which are stored in the storage module MST3. In the example represented, the selected secondary call identifier $IA_m$ is a telephone number. However, as a variant and depending on the context of the communication to be established, the secondary call identifier may be an alias, a pseudo or a network identity of type msisdn, IP address, email address, E.164 address, SIP address. Furthermore, this secondary call identifier may be recorded in association with an identifier IDS of the service to which the user UT1 of the first communication device DC1 has subscribed. For this purpose, this secondary identifier has a duration of validity which corresponds for example to the duration of subscription to this service or else to a predetermined duration, fixed beforehand by the administrator of the communication management platform DGC.

According to one embodiment, as will be described in greater detail in the subsequent description, the predetermined call identifiers $IAD_1$, $IAD_2$, ..., $IAD_n$, ..., $IAD_K$ are of various types. One or more of these identifiers may be a telephone number associated with a communication network of fixed type and comprising for this purpose a particular prefix PF1. Another or several other of these identifiers may be a telephone number associated with a communication network of mobile type and comprising for this purpose a particular prefix PF2. Yet another or several other of these identifiers may be a special-tariff telephone number and comprising for this purpose a particular prefix PF3.

The profile manager GP is connected to a switching center CMT which is able to process the path of the communication established from the communication device DC1 up to the communication device DC2, such as are represented in FIG. 1.

The switching center CMT is well known per se. In the example represented, it corresponds for example to a mobile switching center "MSC" of a mobile telecommunications network. According to another embodiment in which the communication device DC1 would be of fixed type, the switching center CMT could be a local switch of a fixed telecommunications network. It will be noted that in the fixed telecommunications network, the local switch processes the local calls between subscribers of one and the same switch as well as the departure and the arrival of the traffic with the other switches.

The switching center CMT is characterized by two main functions.

The first main function is a call control function which corresponds to the central function of a telephone switch. Such a function implements various operations such as the decoding of address information and the routing of telephone calls from a first calling communication device to a second called communication device. Such a function is associated with certain call functionalities such as:
  placing of the call on standby,
  call transfer to voice messaging when the called communication device is not picked up,
  a particular ring tone indicating to the caller that the opposite party is already on line or not reachable.

This first function processes moreover the signaling level established in the course of the communication between the two communication devices, that is to say the level corresponding to the signaling of the messages exchanged via the various entities of the communication network.

The second main function is a "Media" function for processing the entire Media part of the communication between the two communication devices. Such a function corresponds to the "Media" level of processing of the text data and/or audio data and/or of the images/videos exchanged between the two communication devices during the communication.

It should be noted that although in the embodiment represented in FIG. 2, the profiles manager GP and the switching center CMT are hosted together on the communication management platform DGC, this example is in no way limiting.

Indeed, in a variant embodiment, the communication management platform DGC could contain solely the profiles manager GP, the switching center CMT being hosted at some other location in the network but always connected functionally to the profiles manager GP.

Figure 3:
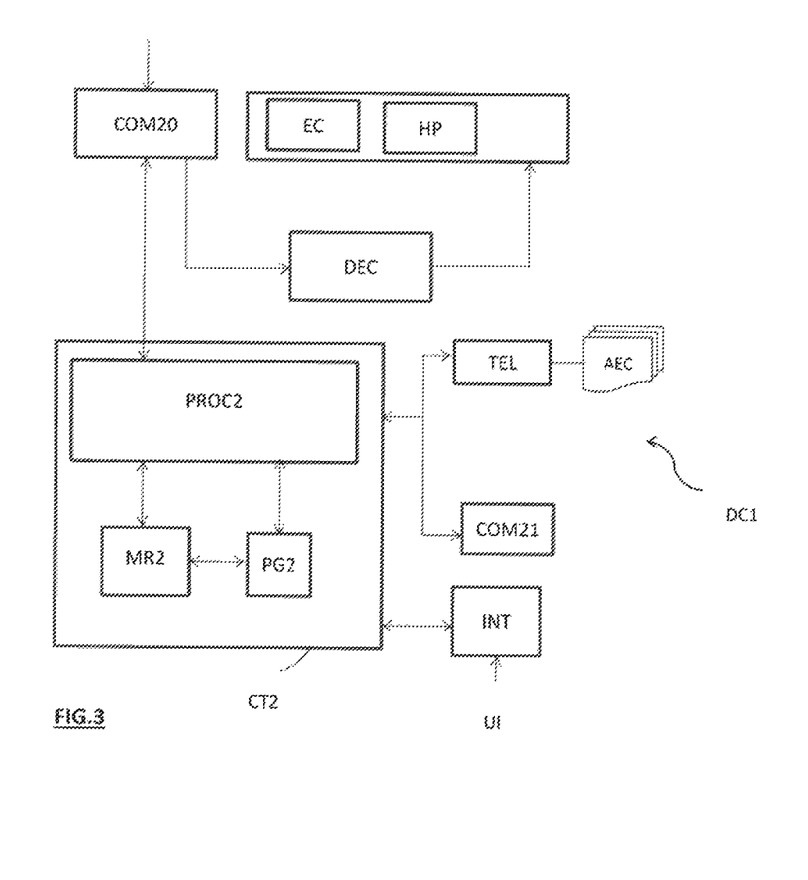
FIG. 3 presents the simplified structure of an embodiment of a communication device initiating a communication in the system of FIG. 1.

In conjunction with FIG. 3, the simplified structure of the communication device DC1 according to an exemplary embodiment of the invention is now considered.

For example, the communication device DC1, here a mobile telephone, comprises physical and/or software resources, in particular a processing circuit CT2 for implementing the exchanges with the communication management platform DGC of FIGS. 1 and 2 prior to the communication to be established, and then once said communication has been established.

The processing circuit CT2 contains a processor PROC2 driven by a computer program PG2.

On initialization, the code instructions of the computer program PG2 are for example loaded into a RAM memory, denoted MR2, before being executed by the processing circuit CT2.

The communication device DC1 comprises mainly:
  a communication interface COM20 which is adapted to exchange messages with the profiles manager GP of the communication management platform DGC of FIGS. 1 and 2, via the communication network RC1 or another data communication network, not represented, said messages being in accordance for example with the http (English abbreviation standing for "HyperText Transfer Protocol") protocol,
  a communication interface COM21 able to establish/receive a call via the communication network and which, depending on the type of communication to be established, maybe a communication interface able to send or receive voice calls or a communication interface able to send or receive text messages of SMS type or else a communication interface able to send or receive multimedia messages of MMS type.

The communication device DC1 also comprises:
  a module INT for processing the user interactions UI,
  a viewing screen EC,
  a loudspeaker HP,
  an interface DEC for the audio/video decoding of the contents of text, audio, video or audiovisual type, said interface being adapted to transmit the decoded signals to the screen EC or in the loudspeaker HP,
  a module TEL for the downloading of contents of text and/or audio and/or audiovisual type or else of applications.

More particularly, the communication interface COM20 is able, prior to the establishment of the communication with the second communication device DC2, to dispatch, destined for the communication management platform DGC, a message which comprises:
  the identification information items associated with the communication device DC1 and which have been previously recorded, as explained above, in the storage module MST3 of the communication management platform DGC,
  the main call identifier IAP2 of the communication device DC2 to be called.

Furthermore, the communication interface COM20 is able to receive, originating from the communication management platform DGC, via the communication interface COM10 of the latter:
  either, one of the predetermined call identifiers $IAD_1$, $IAD_2$, ..., $IAD_n$, ..., $IAD_K$ which have been previously stored in the storage module MST2. The selection of this or that predetermined call identifier as call identifier dedicated to the communication to be established will be described in greater detail in the subsequent description,
  or else, a message indicating the absence of dedicated call identifier.

The downloading module TEL of the communication device DC1 is furthermore able to download, from the communication management platform DGC, an application AEC dedicated to the establishment of a communication in accordance with the present invention. The function of said application is in particular, in reply to the reception of a message indicating a call identifier dedicated to the communication to be established and such as selected by the communication management platform DGC, to trigger a call, via the communication network RC1, to this dedicated call identifier. The function of said application is also, in reply to the reception of a message indicating the absence of dedicated call identifier, to trigger a call from the communication device DC1 directly destined for the main call identifier IAP2 of the communication device DC2, using the main call identifier IAP1 of the communication device DC1.

The communication interfaces COM20, COM21, the downloading module TEL, as well as the module INT for processing the user interactions, are driven by the processor PROC2 of the processing circuit CT2.

Figure 4:
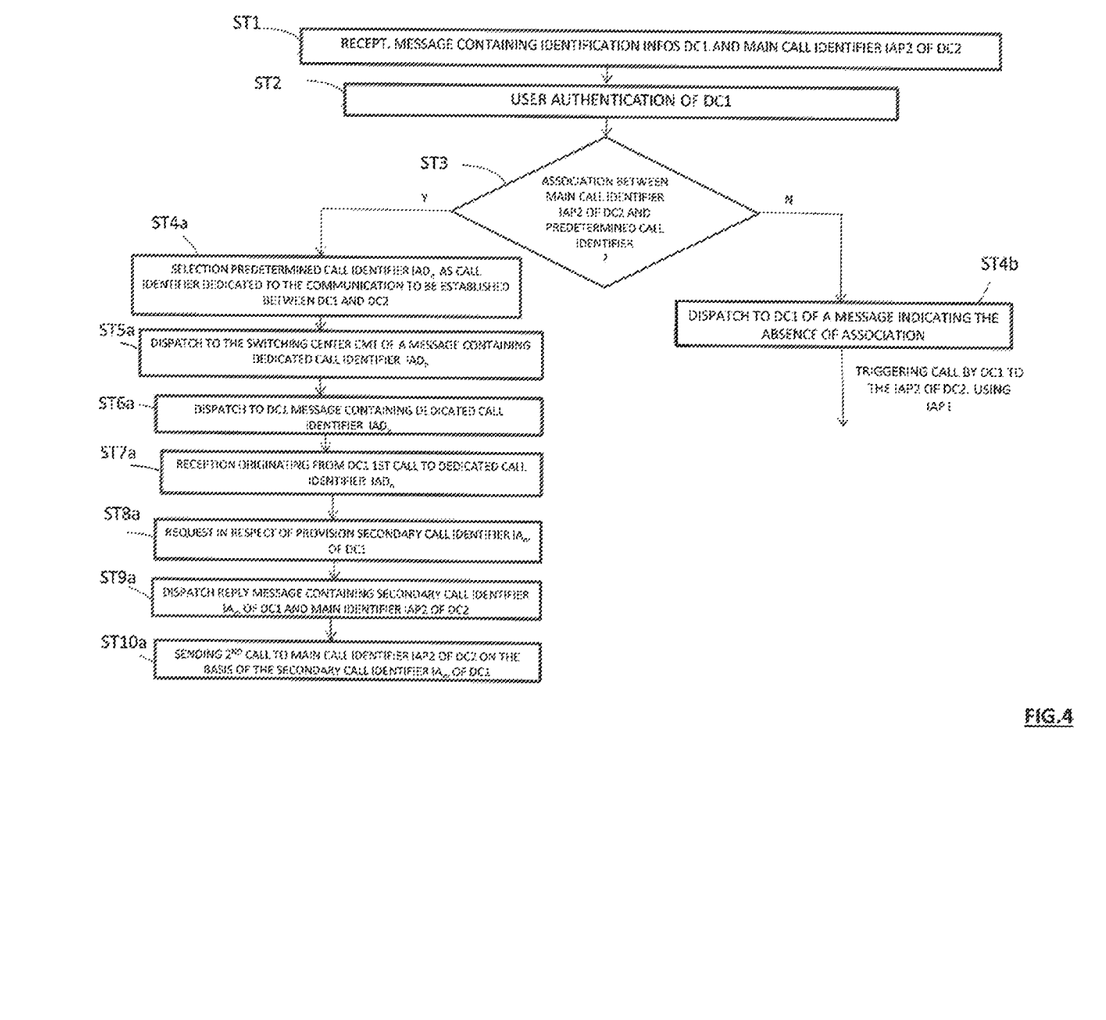
FIG. 4 represents the main steps of a method for establishing a communication in the system of FIG. 1, FIGS. 5A to 5B represent details of implementation of the method illustrated in FIG. 4.

With reference to FIG. 4, the running of a method, such as implemented in the communication management platform DGC, for establishing a communication according to the invention is now described.

Prior to the running of this method, it is considered that:
   the application AEC for establishing a communication to a dedicated call identifier has been previously downloaded by the downloading module TEL of the communication device DC1,
   the user UT1 of the communication device DC1 has communicated the identification information items associated with their communication device DC1 to the communication management platform DGC,
   a secondary call identifier, chosen from the pool of secondary call identifiers $IA_1, IA_2, \ldots, IA_m, \ldots, IA_J$ available at the moment of the request from the user UT1, has been communicated in return to the communication device DC1 by the platform DGC. The selected secondary call identifier is for example the identifier $IA_m$.

Generally, the method for establishing a communication according to the invention is implemented in the case where the user UT1 of the communication device DC1 wishes to initiate a communication from said device destined for the communication device DC2 of FIG. 1.

For this purpose, in the course of a step ST1 represented in FIG. 4, the profiles manager GP of the communication management platform DGC receives originating from the communication device DC1, via its communication interface COM10, a message, for example according to the http protocol, which contains:
   the identification information items relating to the communication device DC1,
   the main call identifier IAP2 of the communication device DC2.

In the course of a step ST2, the platform DGC verifies that the user UT1 is authenticated by comparing the identification information items contained in the message received with those recorded in the storage module MST3 of FIG. 2.

By way of variant, such a step ST2 can take place prior to step ST1, the message dispatched by the communication device DC1 to the platform DGC containing for example only the identification information items associated with the communication device DC1.

In the course of a step ST3, the platform DGC searches for an association between the main call identifier IAP2 of the communication device DC2, such as received in step ST1, and a predetermined call identifier, from among the predetermined call identifiers $IAD_1, IAD_2, \ldots, IAD_n, \ldots, IAD_K$ stored in the storage module MST2.

As a function of the context of the communication to be established, such an association advantageously takes into account:
   either the main call identifier IAP2 of the communication device DC2, such as contained in the message received in step ST1,
   or a communication service associated with the communication to be established, to which the user UT1 of the communication device DC1 has previously subscribed.

Such a predetermined call identifier is intended to be used as intermediate call identifier to which the communication initiated by the first communication device DC1 is directed, before being routed to the main identifier IAP2 of the second communication device DC2. Such a predetermined call identifier is known both to the platform DGC and to the switching center CMT represented in FIG. 2. Although in FIG. 2, the storage module MST2 containing these predetermined call identifiers is linked to the profiles manager, the predetermined call identifiers could equally well be delivered by the switching center CMT on request of the profiles manager GP, whenever the first communication device DC1 wishes to initiate a communication.

Figure 5A:
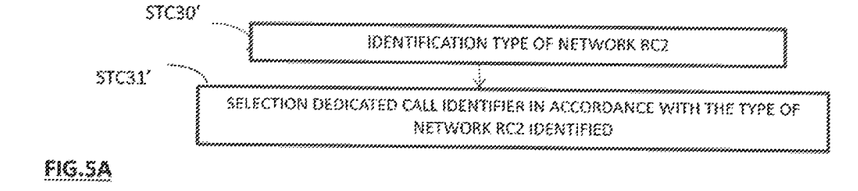

In the case where during the search for association, it is the main call identifier IAP2 of the communication device DC2 which is taken into account, according to an example represented in FIG. 5A, there is undertaken, in the course of a step STC30', an identification of the type of the network RC2 (FIG. 1) to which the second communication device DC2 is connected. In the course of a step STC31', a predetermined call identifier is then selected from the storage module MST2 in accordance with the type of network identified. For example, in the case where such a network is of mobile type, a dedicated call identifier $IAD_n$ corresponding to a mobile telephone number is selected from the storage module MST2. In the case where such a network is of fixed type, a dedicated call identifier $IAD_n$ corresponding to a fixed telephone number is selected from the storage module MST2. According to a variant of step STC31', the predetermined call identifier is selected from the storage module MST2 as having the same prefix as that of the main call identifier IAP2 of the second communication device DC2.

Figure 5B:
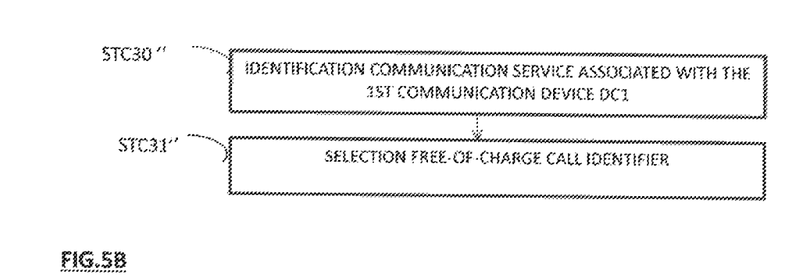

In the case where during the search for association, it is a communication service associated with the communication to be established which is taken into account, according to an example represented in FIG. 5B, there is undertaken, in the course of a step STC30", a check, in the storage memory MST3 of the platform DGC, to verify that an identifier IDS of such a communication service has indeed been recorded in association with the identification information items associated with the first communication device DC1. For example, the presence or the absence of the service identifier IDS in the storage module MST3 is indicated by a flag set respectively to 1 or 0. In the case of the presence of the service identifier IDS, in the course of a step STC31", a predetermined call identifier is then selected from the storage module MST2 as free-of-charge call number dedicated to the communication to be established between the communication devices DC1 and DC2. According to an exemplary embodiment, such a communication service is for example a company communication service, in which an employee wishes to establish a communication of professional type from the first communication device DC1 which here is the employee's personal telephone.

With reference again to FIG. 4, in the case where, on completion of step ST3, a predetermined call identifier, for example $IAD_n$, is found, there is undertaken, in the course of a step ST4a, the selection of this identifier as call identifier dedicated to the communication to be established between the communication devices DC1 and DC2.

In the course of a step ST5a, the profiles manager GP of FIG. 2 dispatches a message to the switching center CMT to inform it that a dedicated call identifier $IAD_n$ has been selected for the communication to be established from the first communication device DC1 to the second communication device DC2.

Such a message comprises the call identifier $IAD_n$, dedicated to the communication to be established. This message could furthermore contain the main call identifier of the first communication device DC1, in the case where several communication devices establish a communication destined for the identifier $IAD_n$.

In the course of a step ST6a, which may be implemented either before or after step ST5a, or simultaneously in step ST5a, the profiles manager GP dispatches a message to the first communication device DC1, via the communication interface COM10 of the platform DGC, for example according to the http protocol, said message containing the dedicated call identifier $IAD_n$. In the example represented, this dedicated call identifier is a telephone number.

Subsequent to the reception of such a message by the first communication device DC1, the application AEC dedicated to the establishment of the communication, such as installed in the downloading module TEL of the first communication device DC1, triggers the dispatch of a call from its communication interface COM21, via the communication network RC1, to the dedicated call identifier $IAD_n$, using its main call identifier IAP1.

In the course of a step ST7a, this call is received by the switching center CMT, via the communication interface COM11 of FIG. 2. The switching center CMT having the knowledge of the dedicated call identifier $IAD_n$ then identifies this call as a first branch of the communication to be established between the first communication device DC1 and the second communication device DC2.

In the course of a step ST8a, the switching center CMT dispatches to the profiles manager GP of FIG. 2 a request in respect of provision of the secondary call identifier $IA_m$, previously allocated to the first communication device DC1 by the profiles manager GP.

In the course of a step ST9a, in reply to the request, the profiles manager GP dispatches to the switching center CMT a message containing the secondary call identifier $IA_m$ as well as the main call identifier IAP2 of the second communication device DC2.

The exchanges between the switching center CMT and the profiles manager GP are for example in accordance with the SIP (from the English "Session Initiation Protocol") protocol.

On receipt of this message, in the course of a step ST10a, the switching center CMT establishes a call destined for the main call identifier IAP2 of the second communication device DC2 on the basis of the secondary call identifier $IA_m$ of the first communication device DC1. The switching center CMT then identifies this call as a second branch of the communication to be established between the first communication device DC1 and the second communication device DC2.

In the case where the second communication device DC2 replies to the call, the switching center CMT establishes the communication between the first communication device DC1 and the second communication device DC2. The user UT1 of the first communication device DC1 is thus assured that their main call identifier IAP1 will not be disclosed to the user of the second communication device DC2. Furthermore, in the particular case where the user is employed by a company and the communication device DC1 is their personal telephone, the user is assured that their communication destined for the communication device DC2 will not be billed to them.

In the case where, on completion of step ST3, no association is found, in the course of a step ST4b, the communication management platform DGC dispatches to the communication device DC1, via its communication interface COM10, a message, for example according to the http protocol, which indicates the absence of association. According to an exemplary embodiment, such a message can contain a particular error code.

Such an association is not found, in the case for example where the main call identifier IAP2 of the communication device DC2 is an emergency number (fire brigade, police, etc . . . ), a premium rate call number or else any call identifier whose prefix does not correspond to any of the prefixes of the predetermined call identifiers $IAD_1$, $IAD_2, \ldots, IAD_n, \ldots, IAD_K$ which have been previously stored in the storage module MST2.

On reception of such a message on the communication interface COM20 of the communication device DC1, the latter's application AEC recognizes the content of this message and triggers a call from the communication device DC1 directly destined for the main call identifier IAP2 of the communication device DC2, using the main call identifier IAP1 of the communication device DC1.

Such a call may be triggered directly by the application AEC, in compliance with for example the SIP protocol. Alternatively, such a call may be of the voice/SMS/MMS type and be sent directly via the communication interface COM21 of the communication device DC1.

By virtue of this arrangement, even in the case where an association cannot be found between the main call identifier IAP2 of the communication device DC2 and a predetermined call identifier, a communication of conventional type can despite everything be established between the communication devices DC1 and DC2, by using the main call identifier IAP1 of the communication device DC1.

Furthermore, such an arrangement is adaptable to calls sent to emergency numbers for which it is prohibited to conceal the main call identifier of the calling communication device.

It goes without saying that the embodiments which have been described hereinabove have been given purely by way of wholly nonlimiting indication, and that numerous modifications may easily be made by the person skilled in the art without however departing from the scope of the invention.

The invention claimed is:

1. A method, performed by a communication management device, comprising:
    receiving a first message, originating from a first communication device, the first message being a message of initiating a communication towards a second communication device, the first and second communication devices each having a main call identifier, said first message comprising:
    identification information items associated with the first communication device in the communication management device; and
    the main call identifier of the second communication device;
    searching for an intermediary phone number dedicated to at least one communication to be routed via said intermediary phone number to said second communication device;
    in response to no intermediary phone number being found, dispatching to the first communication device a second message indicating the absence of the intermediary phone number; and in response to an intermediary phone number dedicated to the at least one communication to be routed being found, implementing an association between the main call identifier of the second communication device and the intermediary phone number dedicated to the at least one communication to be routed, wherein:

the intermediary phone number dedicated to the at least one communication to be routed is dependent on the main call identifier of the second communication device, and said association implements an identification of a type of network to which the second communication device is connected, and a selection of the intermediary phone number dedicated to the communication to be routed in accordance with the type of network identified; or the intermediary phone number dedicated to the at least one communication to be routed is dependent on a communication service associated with the communication to be routed, and said association implements a selection of the intermediary phone number corresponding to a free-of-charge phone number, as the intermediary phone number dedicated to the communication to be routed.

2. A communication management platform comprising a processing circuit which is designed to:

receive a first message originating from a first communication device, the first message being a message of initiating a communication towards a second communication device, the first and second communication devices each having a main call identifier, and said first message comprising:

identification information items associated with the first communication device in the communication management platform; and the main call identifier of the second communication device;

search for an intermediary phone number dedicated to at least one communication to be routed via said intermediary phone number to said second communication device;

in response to no intermediary phone number dedicated to the communication being found, dispatch to the first communication device a second message indicating the absence of the intermediary phone number dedicated to the communication; and in response to an intermediary phone number dedicated to the at least one communication to be routed being found, implement an association between the main call identifier of the second communication device and the intermediary phone number dedicated to the at least one communication to be routed, wherein:

the intermediary phone number dedicated to the at least one communication to be routed is dependent on the main call identifier of the second communication device, and said association implements an identification of a type of network to which the second communication device is connected, and a selection of the intermediary phone number dedicated to the communication to be routed in accordance with the type of network identified; or the intermediary phone number dedicated to the at least one communication to be routed is dependent on a communication service associated with the communication to be routed, and said association implements a selection of the intermediary phone number corresponding to a free-of-charge phone number, as the intermediary phone number dedicated to the communication to be routed.

3. A non-transitory computer-readable medium comprising a computer program stored thereon, comprising program code instructions for executing a method when said program is executed on a communication management device, the method comprising:

receiving a first message, originating from a first communication device, the first message being a message of initiating a communication towards a second communication device, the first and second communication devices each having a main call identifier, and said first message comprising:

identification information items associated with the first communication device in the communication management device; and the main call identifier of the second communication device;

searching for an intermediary phone number dedicated to at least one communication to be routed via said intermediary phone number to said second communication device;

in response to no intermediary phone number dedicated to the communication being found, dispatching to the first communication device a second message indicating the absence of the intermediary phone number dedicated to the communication; and in response to an intermediary phone number dedicated to the at least one communication to be routed being found, implementing an association between the main call identifier of the second communication device and the intermediary phone number dedicated to the at least one communication to be routed, wherein:

the intermediary phone number dedicated to the at least one communication to be routed is dependent on the main call identifier of the second communication device, and said association implements an identification of a type of network to which the second communication device is connected, and a selection of the intermediary phone number dedicated to the communication to be routed in accordance with the type of network identified; or the intermediary phone number dedicated to the at least one communication to be routed is dependent on a communication service associated with the communication to be routed, and said association implements a selection of the intermediary phone number corresponding to a free-of-charge phone number, as the intermediary phone number dedicated to the communication to be routed.

4. The method of claim 1, wherein said method comprises obtaining said intermediary phone number from a communication switching center.

5. The method of claim 1, further comprising, in response to said intermediary phone number being found:

registering said intermediary phone number in association with a secondary call identifier of the first communication device associated to said identification information items in the communication management device;

dispatching said intermediary phone number to said first communication device.

6. The method of claim 4, further comprising dispatching said secondary call identifier associated to said intermediary phone number to a communication switching center in charge of routing communications directed to said intermediary phone number to said main call identifier of said second communication device.

7. The communication management platform of claim 2, wherein the processing circuit is designed to obtain said intermediary phone number from a communication switching center.

8. The communication management platform of claim 2, wherein the processing circuit is designed to:
in response to said intermediary phone number being found:
register said intermediary phone number in association with a secondary call identifier of the first communication device associated to said identification information items in the communication management device;
dispatch said intermediary phone number to said first communication device.

9. The communication management platform of claim 2 wherein the processing circuit is designed to dispatch said secondary call identifier associated to said intermediary phone number to a communication switching center in charge of routing communications directed to said intermediary phone number to said main call identifier of said second communication device.

10. The communication management platform of claim 2 wherein said processing circuit is designed to route communications directed to said intermediary phone number to said main call identifier of said second communication device.

11. The communication management platform of claim 8, wherein said processing circuit is designed to intercept communications of the first communication device to said intermediary phone number and to route said communications to said main call identifier of said second communication device, by using said secondary call identifier.

12. The communication management platform of claim 7, wherein said communication switching center is a Mobile Switching Center (MSC) of a Mobile telecommunications network.

13. The communication management platform of claim 7, wherein said communication switching center is a local switch of a fixed telecommunications network.

14. A method performed in a first communication device comprising:
dispatching a first message destined for a communication management device, the first message being a message of initiating a communication towards a second communication device having a main call identifier, said first message comprising:
identification information items associated with the first communication device in the communication management device; and
the main call identifier of the second communication device;
upon receiving, in response to said first message, a second message indicating absence of an intermediary phone number dedicated to at least one communication to be routed via said intermediary phone number with said second communication device, triggering a communication destined for the second communication device, using said main call identifier of the first communication device and said main call identifier of the second communication device; and
upon receiving, in response to said first message, an intermediary phone number dedicated to at least one communication to be routed, via said intermediary phone number, to said second communication device, initiating a communication with said intermediary phone number, wherein:
the intermediary phone number dedicated to the at least one communication to be routed is dependent on the main call identifier of the second communication device and on a type of network to which the second communication device is connected; or
the intermediary phone number dedicated to the at least one communication to be routed is dependent on a communication service associated with the communication to be routed and corresponds to a free-of-charge phone number.

15. The method of claim 14, wherein the intermediary phone number dedicated to the at least one communication to be routed is dependent on the main call identifier of the second communication device and on the type of network to which the second communication device is connected.

16. The method of claim of claim 14, wherein the intermediary phone number dedicated to the at least one communication to be routed is dependent on the communication service associated with the communication to be routed and corresponds to the free-of-charge phone number.

17. A non-transitory computer-readable medium comprising a computer program stored thereon comprising program code instructions for executing the method of claim 14 when said program is executed on said first communication device.

18. A first communication device comprising a processing circuit designed to implement the method of claim 14.

19. The first communication device of claim 18, wherein the intermediary phone number dedicated to the at least one communication to be routed is dependent on the main call identifier of the second communication device and on the type of network to which the second communication device is connected.

20. The first communication device of claim 18, wherein the intermediary phone number dedicated to the at least one communication to be routed is dependent on the communication service associated with the communication to be routed and corresponds to the free-of-charge phone number.

* * * * *